United States Patent
Hauvespre et al.

(10) Patent No.: US 9,638,071 B2
(45) Date of Patent: May 2, 2017

(54) METHOD FOR MANUFACTURING A ROLLER, ADAPTED TO EQUIP A MECHANICAL SYSTEM FORMING A CAM FOLLOWER OR A ROCKER ARM

(71) Applicants: Benoît Hauvespre, Saint Etienne de Chigny (FR); Julien Maffucci, Pernay (FR)

(72) Inventors: Benoît Hauvespre, Saint Etienne de Chigny (FR); Julien Maffucci, Pernay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/710,643

(22) Filed: May 13, 2015

(65) Prior Publication Data
US 2015/0330264 A1  Nov. 19, 2015

(30) Foreign Application Priority Data
May 13, 2014  (EP) ..................... 14305697

(51) Int. Cl.
*F16H 53/06* (2006.01)
*F01L 1/14* (2006.01)
(Continued)

(52) U.S. Cl.
CPC ........ *F01L 1/14* (2013.01); *B24B 7/17* (2013.01); *B24B 19/028* (2013.01); *F01L 1/18* (2013.01);
(Continued)

(58) Field of Classification Search
CPC ..... F01L 1/14; F01L 1/143; F01L 1/18; F01L 2103/00; F01L 2105/00; F01L 2105/02;
(Continued)

(56) References Cited

U.S. PATENT DOCUMENTS

| | | | |
|---|---|---|---|
| 6,789,949 B2 * | 9/2004 | Suzuki | F16C 19/364 384/462 |
| 7,377,042 B2 * | 5/2008 | Krintzline | B21J 5/02 29/898.068 |
| 2015/0369097 A1 * | 12/2015 | Hauvespre | F01M 9/106 74/559 |

FOREIGN PATENT DOCUMENTS

| | | | | |
|---|---|---|---|---|
| DE | 102009036799 B3 * | 12/2010 | | B24B 5/04 |
| DE | 102009029297 A1 * | 3/2011 | | F04B 1/00 |

(Continued)

OTHER PUBLICATIONS

Machine translation of DE 102009029297 A1 obtained on Jan. 19, 2016.*

(Continued)

*Primary Examiner* — Adam D Rogers
(74) *Attorney, Agent, or Firm* — Bryan Peckjian; SKF USA Inc. Patent Dept.

(57) ABSTRACT

A method for manufacturing a roller, adapted to equip a mechanical system forming a cam follower or a rocker arm. The roller is centered on a central axis and comprising: an outer cylindrical surface adapted to roll on a cam, an inner cylindrical bore adapted to receive a pin belonging to the mechanical system, and two lateral faces extending radially to the central axis. The method includes a machining step forming circular grooves that are concentric with each other on at least one of the lateral faces of the roller. The roller can be installed within a mechanical system.

15 Claims, 4 Drawing Sheets

(51) Int. Cl.
B24B 19/02 (2006.01)
B24B 7/17 (2006.01)
F02M 59/10 (2006.01)
F01L 1/18 (2006.01)

(52) U.S. Cl.
CPC .......... F02M 59/102 (2013.01); F16H 53/06 (2013.01); *F01L 2103/00* (2013.01); *F01L 2105/00* (2013.01); *F01L 2105/02* (2013.01); *F01L 2107/00* (2013.01); *Y10T 29/49544* (2015.01); *Y10T 74/2107* (2015.01); *Y10T 408/03* (2015.01)

(58) Field of Classification Search
CPC ........ F01L 2107/00; B24B 7/17; B24B 19/02; B24B 19/028; F02M 59/102; F16C 33/34; F16C 33/36; F16C 33/363; F16C 2220/60; F16C 2220/70; F16H 53/06; B23D 79/00; Y10T 408/03; Y10T 29/49544; Y10T 74/2107; Y10T 74/20582; Y10T 29/49565
See application file for complete search history.

(56) References Cited

FOREIGN PATENT DOCUMENTS

| | | | | |
|---|---|---|---|---|
| EP | 2607636 A1 | 6/2013 | | |
| FR | 2600926 A1 * | 1/1988 | ............. | B24B 19/02 |
| IT | DE 10016750 A1 * | 10/2001 | ............... | B24B 7/17 |
| JP | 7091452 A | 4/1995 | | |
| JP | 7103243 A | 4/1995 | | |
| JP | DE 102004014279 A1 * | 10/2004 | ............ | F16C 19/364 |
| WO | WO 2008005384 A2 * | 1/2008 | ............. | F01L 1/146 |

OTHER PUBLICATIONS

Machine translation of DE 102009036799 B3 obtained on Jan. 19, 2016.*

Machine translation of FR 2600926 A1 obtained on Jan. 20, 2016.*

Machine translation of JP 07103243 A1 obtained on Jan. 14, 2016.*

* cited by examiner

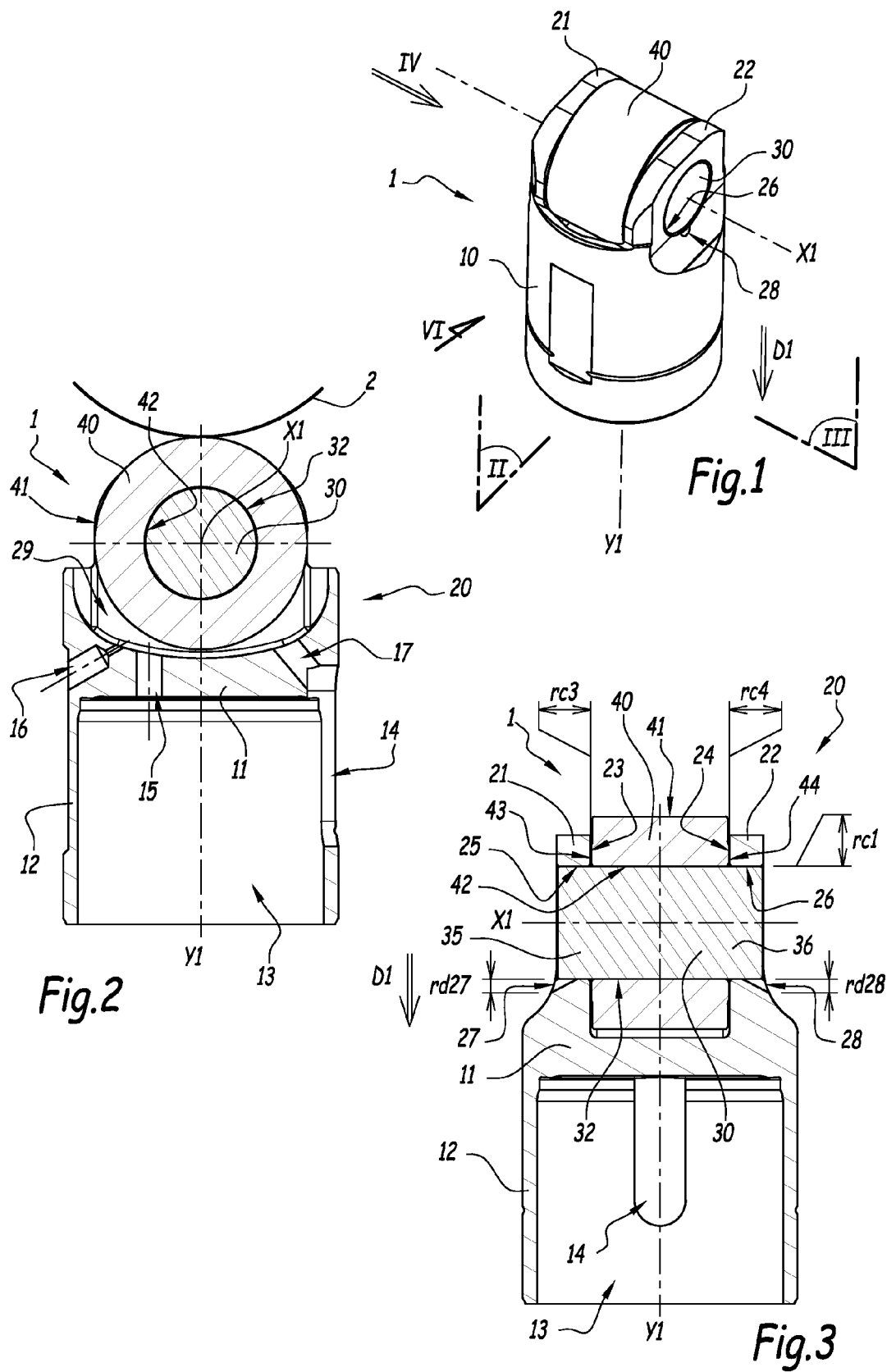

METHOD FOR MANUFACTURING A ROLLER, ADAPTED TO EQUIP A MECHANICAL SYSTEM FORMING A CAM FOLLOWER OR A ROCKER ARM

CROSS REFERENCE TO RELATED APPLICATIONS

This is a Non-Provisional Patent Application, filed under the Paris Convention, claims the benefit of European Patent (EP) Application Number 14305697.6 filed on 13 May 2014, which is incorporated herein by reference in its entirety.

TECHNICAL FIELD OF THE INVENTION

The invention concerns a method for manufacturing a roller, adapted to equip a mechanical system forming a cam follower or a rocker arm. The invention also concerns a mechanical system comprising such a roller. The invention also concerns an injection pump or a valve actuator, comprising such a mechanical system.

BACKGROUND OF THE INVENTION

EP-A-2 607 636 describes an example of a cam follower for an injection pump.

Classically, a cam follower comprises at least a tappet, a pin and a roller. The pin and the roller are centered on a transverse axis, while the tappet extends along a longitudinal axis. The tappet is formed with two lateral flanges, delimiting an intermediate gap between them and each comprising a cylindrical bore. The roller is positioned in the intermediate gap, between both flanges and bores. The pin is fitted in the two bores, such that the roller is movable in rotation relative to the pin around its axis. The pin may be caulked, in other words plastically deformed, on both opposite ends to create a mechanical connection by press-fit in the tappet bores.

During the roller manufacturing, it is known to grind its lateral faces with two grinding discs. The roller is moved through a gap set between the two discs. The gap has a predetermined width equal to the wished width of the roller. Due to the roughness of the discs and the relative movement between the roller and the discs, such grinding operation makes random traces on the lateral faces of the roller.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis, while the roller is movable in rotation around its central axis. The lateral faces of the roller are likely to slide against the lateral flanges of the tappet, with friction therebetween.

In practice, the random traces made by the grinding operation are likely to facilitate oil leakage by centrifugal effect at the interface between the lateral faces of the roller and the lateral flanges of the tappet. Moreover, those random traces are likely to increase the friction at this interface. Thus, the operation of the cam follower may be hampered, which is not satisfactory.

SUMMARY OF THE INVENTION

The aim of the invention is to provide an improved method for manufacturing a roller, together with an improved mechanical system comprising such a roller.

To this end, the invention concerns a method for manufacturing a roller, adapted to equip a mechanical system forming a cam follower or a rocker arm. The roller is centered on a central axis and comprises: an outer cylindrical surface adapted to roll on a cam; an inner cylindrical bore adapted to receive a pin belonging to the mechanical system; and two lateral faces extending radially to the central axis.

According to the invention, the method includes a machining step in which circular grooves are formed concentric with each other on at least one of the lateral faces of the roller.

Thanks to the invention, when the mechanical system equipped with the roller is in service, the oil leakage by centrifugal effect along the lateral faces of the roller can be reduced, in comparison with random traces. Whereas random traces are likely to facilitate oil leakage along the lateral faces, concentric traces make oil leakage more difficult, thus improving lubrication. Moreover, friction is reduced by the improved surface condition and the improved lubrication.

According to further aspects of the invention which are advantageous but not compulsory, such a method may incorporate one or several of the following features:

The circular grooves are formed concentric with each other and with the central axis on at least one of the lateral faces of the roller.

The circular grooves are formed on a plane lateral face of the roller.

The circular grooves are formed on a projecting portion of the lateral face of the roller, and preferably not on a setback portion of the lateral face of the roller.

The circular grooves are formed on both lateral faces of the roller.

Two discs form the circular grooves during the machining step, by simultaneously grinding the two lateral faces of the roller.

A disc forms the circular grooves during the machining step.

A reamer forms the circular grooves during the machining step.

The invention also concerns a mechanical system, forming a cam follower or a rocker arm, the mechanical system comprising: at least one support element; a pin supported by the support element; and a roller centered on a central axis and comprising an outer cylindrical surface adapted to roll on a cam, an inner cylindrical bore adapted to receive the pin, and two lateral faces extending radially to the central axis.

According to the invention, circular grooves are formed concentric with each other on at least one of the lateral faces of the roller.

Thanks to the invention, when the mechanical system is in service, the oil leakage by centrifugal effect can be reduced between the lateral faces of the roller and the support element, in comparison with random traces. Thus, lubrication is improved and friction is reduced. Consequently, functioning and lifetime of the mechanical system are improved.

According to further aspects of the invention, advantageous but not compulsory, such a mechanical system may incorporate one or several of the following features:

The circular grooves are formed concentric with each other and with the central axis on at least one of the lateral faces of the roller.

The circular grooves are formed on both lateral faces of the roller.

The mechanical system forms a cam follower, wherein the support element is a tappet movable in translation along a second axis perpendicular to the first axis.

The mechanical system forms a rocker arm, wherein the support element is an arm movable in rotation along a pivot axis parallel to the first axis.

The invention also concerns an injection pump for a motor vehicle, comprising a mechanical system as mentioned here-above.

The invention also concerns a valve actuator for a motor vehicle, comprising a mechanical system as mentioned here-above.

BRIEF DESCRIPTION OF THE DRAWINGS

The invention will now be explained in correspondence with the annexed figures, and as an illustrative example, without restricting the object of the invention. In the annexed figures:

FIG. 1 is a perspective view of a mechanical system according to the invention, of the cam follower type, comprising a tappet, a pin and a roller;

FIG. 2 is a sectional view along plane II of FIG. 1;

FIG. 3 is a sectional view along plane III of FIG. 1;

DETAILED DESCRIPTION OF SOME EMBODIMENTS

Figure 5:
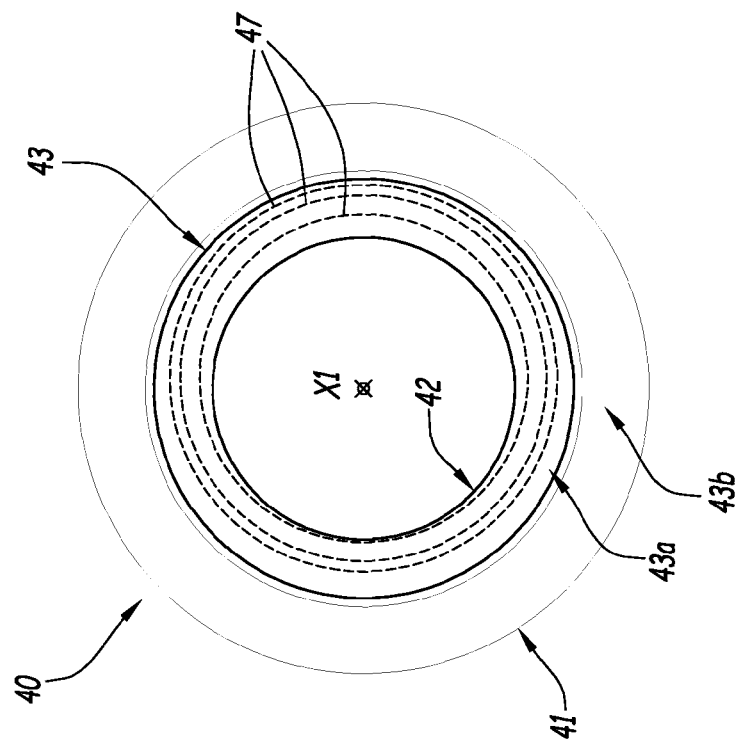
FIG. 5 is an axial view similar to FIG. 4, showing the roller obtained by a variant of the manufacturing method.

The mechanical system 1 represented on FIGS. 1 to 3 is of the cam follower type, adapted to equip an injection pump for a motor vehicle, preferably for a diesel truck engine, not shown.

System 1 comprises a tappet 10, a pin 30 and a roller 40, together forming a plain bearing. In heavy duty applications such as in diesel truck engines, there is a lack of space for the implementation of a rolling bearing, thus justifying the use of a plain bearing. Pin 30 and roller 40 are centered on a transverse axis X1, while tappet 10 is centered on a longitudinal axis Y1. Axis X1 and Y1 are perpendicular. The roller 40 is adapted to roll on a cam 2, shown on FIG. 2.

Tappet 10 comprises a central portion 11 interposed between a cylindrical portion 12 and a bearing portion 20. Portion 12 is centered on axis Y1 and delimits a cavity 13 inside tappet 10. This cavity 13 is adapted to receive a shaft, not shown, for moving tappet 10 along axis Y1. Tappet 10 forms a support element for pin 30 and roller 40.

Specifically, the bearing portion 20 is adapted to receive pin 30 and roller 40. To this end, bearing portion 20 comprises two lateral flanges 21 and 22 extending from central portion 11 parallel to axis Y1 in a bifurcated manner, on both side of axis Y1. The flanges 21 and 22 delimit an intermediate gap 29 between them, with a concave bottom formed on the central portion 11. Each lateral flange 21 and 22 includes a cylindrical bore, respectively 25 and 26. Both bores 25 and 26 have the same diameter and extends through flanges 21 and 22 along axis X1. Flanges 21 and 22 have inner plane faces, respectively 23 and 24, facing gap 29. Preferably, bores 25 and 26 have outer and inner chamfers formed around axis X1, to facilitate the insertion of pin 30 in bores 25 and 26.

The tappet 10 also comprises several holes and bores 14, 15, 16 and 17, provided for lubrication or other functions that are not subjects of the present invention. Due to the positions of holes 13, 14, 15, 16, 17 and 29, central portion 11 is the thickest and most resistant portion of tappet 10.

Roller 40 has an outer cylindrical surface 41 and an inner cylindrical bore 42, which extend between two lateral faces 43 and 44. Face 43 has a projecting portion 43a and a setback portion 43b. Face 44 has a projecting portion 44a and a setback portion 44b. Roller element 40 is positioned in mechanical system 1 before pin 30. More precisely, roller 40 is positioned in the intermediate gap 29, between the two flanges 21 and 22 and the two bores 25 and 26 along axis X1.

Pin 30 comprises a cylindrical surface 32 extending between two pin ends 35 and 36. When pin 30 is inserted in bores 25 and 26 of tappet 10, surface 32 is adjusted with bore 42 of roller 40, such that roller 40 is movable in rotation relative to pin 30 around axis X1. Both pin and roller axis merge with axis X1. Roller 40 is then adapted to roll, more precisely surface 41 can roll, on the outer surface of cam 2.

During assembly of system 1, a radial clearance rc1 may be present between the surface 32 of pin 30 and the inner surface of each bore 25 and 26, radially to axis X1. Existence and value of clearance rc1 depends on manufacturing tolerances of pin 30, as bores 25 and 26. Preferably, clearance rc1 is as small as possible before the caulking step and is further reduced by this caulking step.

As described in EP-A-2 607 636, pin ends 35 and 36 can be caulked by press-fit, respectively in bores 25 and 26. To this end, each bore 25 and 26 is provided with a radial recess, respectively 27 and 28, which extends from the bore 25 or 26 along a radial direction D1 relative to the axis X1. Each recess 27 and 28 has a maximum radial depth, respectively rd27 or rd28, measured radially with respect to axis X1. During the caulking step, the flow of plastically deformed material of pin 30 goes into these recesses 27-28. In other words, each radial recess 27 and 28 is adapted to receive a plastically deformed radial portion, respectively 37 or 38, of the caulked ends 35 and 36 of the pin 30. Thus, an efficient and resistant mechanical connection is provided between tappet 10 and pin 30.

As shown on FIG. 3, a clearance rc3 may be present between faces 23 and 43, while a clearance rc4 may be present between faces 24 and 44, in a direction parallel to axis X1. When surface 41 rolls on cam 2, roller 40 is likely to be shifted along axis X1. In this case, clearance rc3 increases while clearance rc4 decreases, or clearance rc3 decreases while clearance rc4 increases. In other words, when roller 40 moves in rotation around axis X1, faces 23 and 43 are likely to slide against each other, or faces 24 and 44 are likely to slide against each other, with friction therebetween.

Thus, the roughness of faces 43 and 44 is likely to affect, on the one hand, the friction at the interface between tappet 10 and roller 40 and, on the other hand, the flow of lubricant leaking away from this interface by centrifugal effect.

Figure 4:
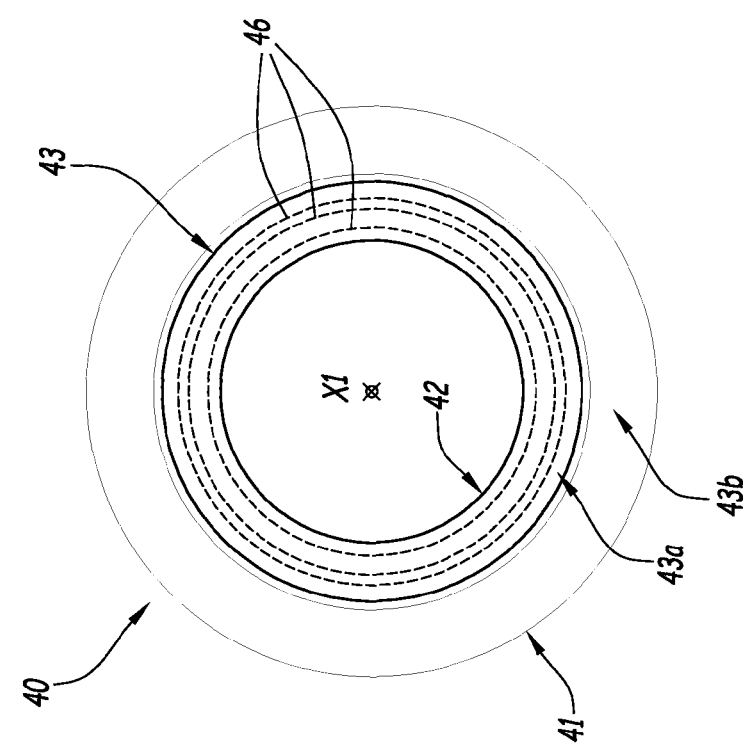
FIG. 4 is an axial view along arrow IV of FIG. 1, showing the roller obtained by the manufacturing method according to the invention.

FIG. 4 shows the roller 40 manufactured with a preferred embodiment of the method according to the invention. During a machining step, circular grooves 46 are formed concentric with each other and with axis X1 on the lateral face 43 of roller 40. More precisely, grooves 46 are formed on the projecting portion 43a, but not on the setback portion 43b of face 43. Preferably, grooves 46 are formed on both faces 43 and 44 of roller 40. The number and distribution of grooves 46 depend on the surface condition and roughness of the tool used during the machining step.

Thanks to the grooves 46, when the mechanical system 1 is in service, the oil leakage by centrifugal effect can be reduced at the interface between the lateral faces 43 and 44 of the roller and the lateral faces 23 and 24 of the tappet 10, in comparison with random traces. Thus, lubrication is improved and friction is reduced at this interface. Consequently, the functioning and the lifetime of system 1 are improved.

FIG. 5 shows the roller 40 manufactured with a variant of the method according to the invention. During the machining step, circular grooves 47 are formed concentric with each other, but not concentric with axis X1, on the lateral face 43 of roller 40. Such grooves 47 may be obtained in case of positioning defect between roller 40 and the tool machining roller 40 during the machining step. However, such grooves 47 still procure the benefits of the invention.

Figure 6:
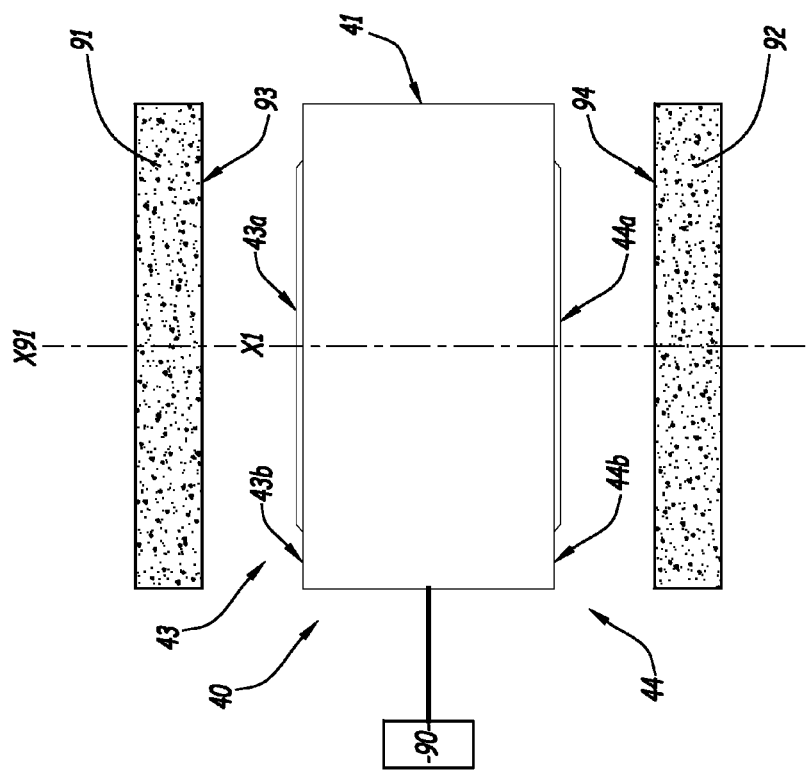
FIG. 6 is a side view along arrow VI of FIG. 1, showing only the roller and tools during a machining step.

FIG. 6 shows a machining step, wherein roller 40 is maintained in a fixed position by a support assembly 90 and is grinded by two grinding discs 91 and 92. Support assembly 90 is represented schematically for simplification purpose. Disc 91 is centered on an axis X91 and has a grinding face 93, while disc 92 is centered on an axis X92 and has a grinding face 94. Preferably, the two lateral faces 43 and 44 are simultaneously grinded by the grinding faces 93 and 94 of discs 91 and 92, in order to form the circular grooves 46 or 47. If axes X1 and X91 are aligned, grooves 46 are made on face 43, while if axes X1 and X91 are slightly offset, grooves 47 are made on face 43. Similarly, if axes X1 and X92 are aligned, grooves 46 are made on face 44, while if axes X1 and X92 are slightly offset, grooves 47 are made on face 44. Alternatively, only one disc 91 or 92 may be used to grind both faces 43 and 44 of roller 40.

Figure 7:
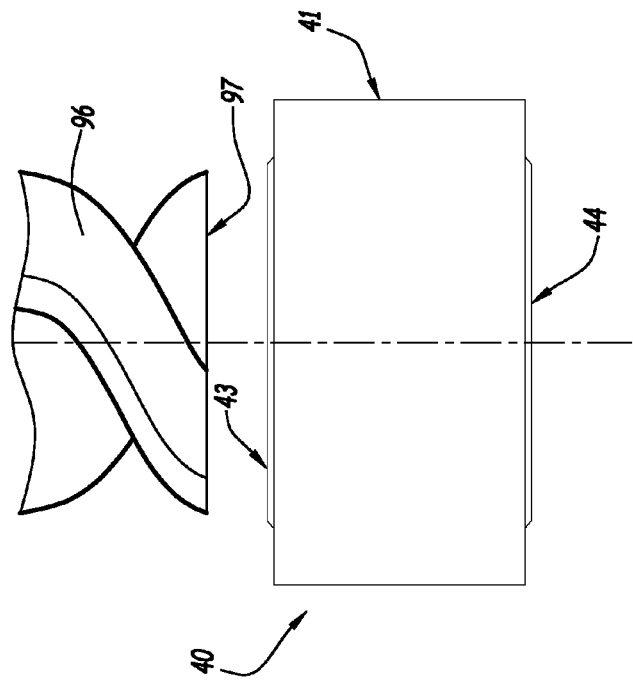
FIG. 7 is a side view similar to FIG. 6, showing a variant of the machining step.

FIG. 7 shows a machining step, wherein roller 40 is machined by a reamer 96. Roller 40 is maintained in a fixed position by a support assembly, not shown for simplification purpose. Reamer 96 has a cutting face 97. Face 43 then face 44 are machined by reamer 96 to form the circular grooves 46 or 47. Alternatively, two reamers may be used to simultaneously machine both faces 43 and 44 of roller 40.

According to non-shown embodiments, the machining step may be performed with other tools than discs or reamers.

Figure 9:
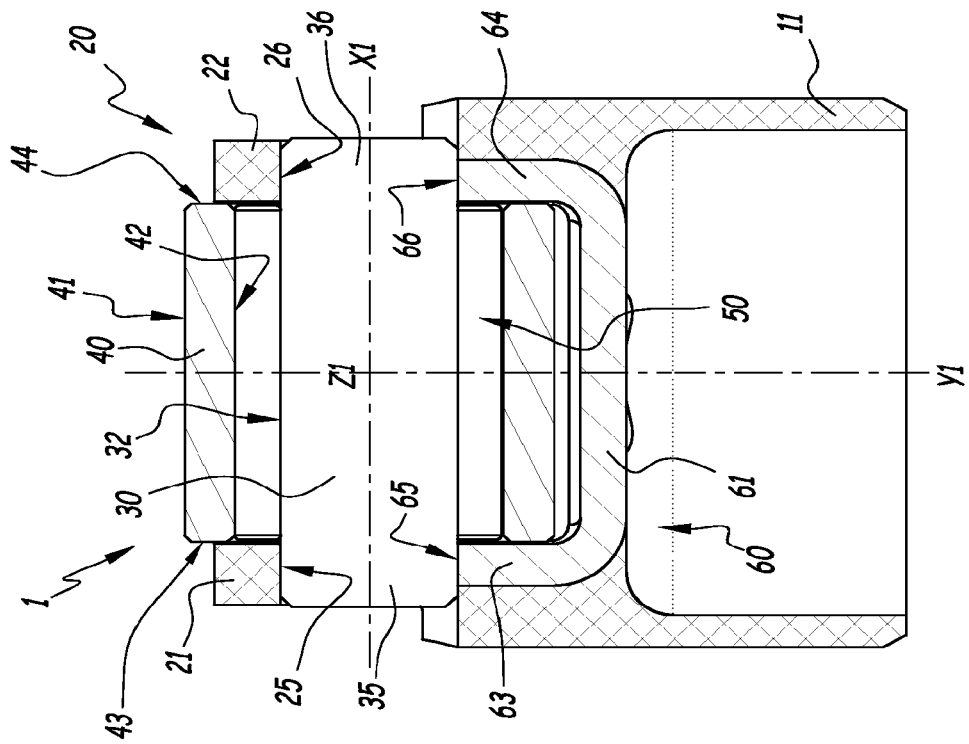
FIGS. 8 and 9 are sectional views similar to FIGS. 2 and 3, respectively, showing a second embodiment of a mechanical system according to the invention.
Figure 8:
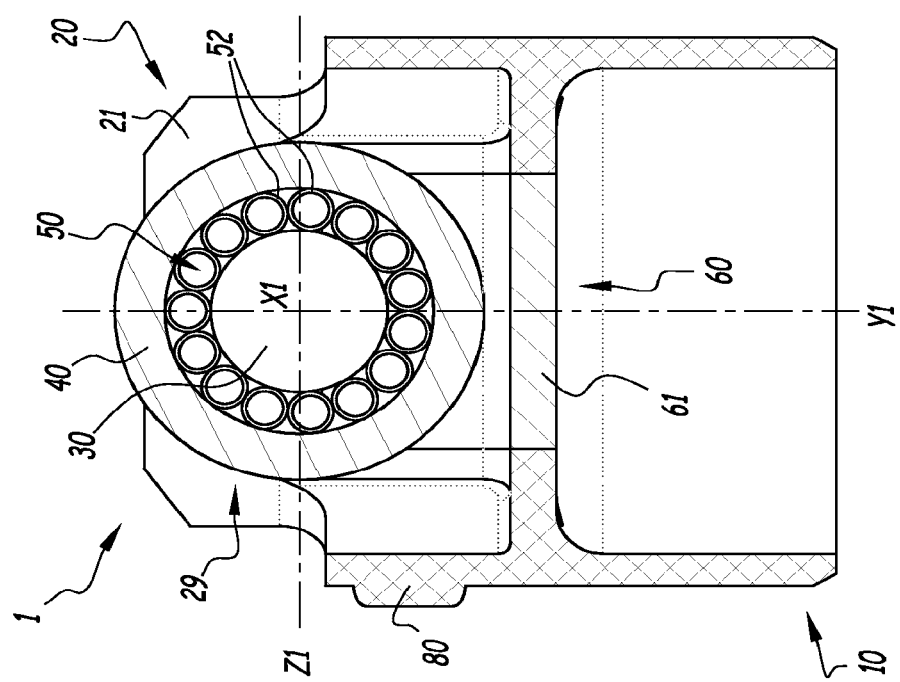

FIGS. 8 and 9 show another embodiment a mechanical system 1 according to the invention. In this embodiment, elements similar to the first embodiment of FIGS. 1 to 3 have the same references and work in the same way. Only the differences with respect to the first embodiment are described hereafter.

On the embodiment of FIGS. 8 and 9, system 1 comprises a tappet 10, a pin 30, a roller 40, a bearing 50, an insert 60 and an antirotation device 80.

Pin 30, in particular its ends 35 and 36, are supported by tappet 10 and insert 60, but not caulked in bores 25 and 26 of tappet 10. Faces 43 and 44 of roller 40 are plane. Rolling bearing 50 comprises a series of needles 52 extending parallel to axis X1 and distributed regularly around axis X1. Rolls 52 are interposed between surface 32 of pin 30 and surface 42 of roller 40. Alternatively, bearing 50 may consist of cylindrical rollers or a sliding bushing.

Insert 60 is preferably made of stamped metal sheet and assembled with tappet 10 by overmolding. Insert 60 comprises a plane central portion 61 and two plane lateral portions 63 and 64. Insert 60 comprises a half-cylindrical section 65 which is formed on portion 63 and which supports end 35 of pin 30 together with bore 25. Insert 60 comprises a half-cylindrical section 66 which is formed on portion 64 and which supports end 36 of pin 30 together with bore 26. In other words, pin 30 is supported by two support elements 10 and 60.

Device 80 is integrally formed with tappet 10, on its outer surface 18. Device 80 is a pin protruding from the outer surface of tappet 10, along a direction parallel to an axis Z1 which is perpendicular to axes X1 and Y1. Pin 80 has an outer surface which cooperates with a non-represented guiding groove, formed in the bore surrounding the tappet 10. Thus, pin 80 prevents tappet 10 from rotating in this bore around axis Y1.

In the embodiment of FIGS. 8 and 9, when roller 40 moves in rotation around axis X1, face 43 is likely to slide against flange 21 and portion 63, while face 44 is likely to slide against flange 22 and portion 64. According to the invention, the plane lateral faces 43 and 44 are provided with circular grooves, similar to grooves 46 or 47 but not shown for simplification purpose.

Whatever the embodiment, the method for manufacturing roller 40 includes a machining step in which circular grooves 46 or 47 are formed concentric with each other on at least one of the lateral faces 43 and/or 44 of the roller 40.

Other non-show embodiments can be implemented within the scope of the invention. For example, support element 10 and/or roller element 40 may have a different configuration depending on the intended application of system 1.

Moreover, the mechanical system 1 according to the invention is not limited to a cam follower. By example, system 1 may form a rocker arm, wherein the support element 10 is an arm movable in rotation along a pivot axis parallel to the axis X1.

According to another non-shown embodiment, radial recesses 27 and 28 may have different shapes, positions and/or dimensions, as described in EP-A-2 607 636.

According to another non-shown embodiment, system 1 may comprise a sliding or rolling bearing, with bearing elements positioned between pin 30 and roller 40.

In addition, technical features of the different embodiments can be, in whole or part, combined with each other. Thus, the mechanical system 1, the roller 40 and its manufacturing method can be adapted to the specific requirements of the application.

The invention claimed is:

1. A method for manufacturing a roller, adapted to equip a mechanical system forming a cam follower, the roller being centered on a central axis and comprising:
   an outer cylindrical surface adapted to roll on a cam;
   an inner cylindrical bore adapted to receive a pin belonging to the mechanical system; and
   two lateral faces extending radially to the central axis, the two lateral faces each comprising a setback portion;
   the method including a step of forming first, second, and third circular grooves on at least one of the lateral faces of the roller using a machining process, wherein the circular grooves are concentric with each other and are not formed on at least one of the setback portions, such that a first distance between the first circular groove and the second circular groove directly adjacent to the first circular groove is larger or smaller than a second distance between the second circular groove and the third circular groove directly adjacent to the second circular groove, such that no other circular grooves are disposed between the first circular groove and the second circular groove, and such that no other circular grooves are disposed between the second circular groove and the third circular groove.

2. The method according to claim 1, wherein the circular grooves are formed concentric with the central axis.

3. The method according to claim 1, wherein the circular grooves are formed on at least one planar face of the at least one of the lateral faces of the roller.

4. The method according to claim 1, wherein the circular grooves are formed on a projecting portion of the at least one lateral face of the roller.

5. The method according to claim 1, wherein the circular grooves are formed on a projecting portion of the two lateral faces of the roller, and not on the setback portions of the lateral faces of the roller.

6. The method according to claim 1, wherein the circular grooves are formed on both lateral faces of the roller.

7. The method according to claim 5, wherein the machining step employs two discs to form the circular grooves by simultaneously grinding the two lateral faces of the roller.

8. The method according to claim 1, wherein the machining step employs a disc to form the circular grooves.

9. The method according to claim 1, wherein the machining step employs a reamer to form the circular grooves.

10. A mechanical system, forming one of a cam follower, the mechanical system comprising:
at least one support element;
a pin supported by the support element; and
a roller centered on a central axis and comprising:
an outer cylindrical surface adapted to roll on a cam,
an inner cylindrical bore adapted to receive the pin, and
two lateral faces extending radially to the central axis,
a setback portion disposed on at least one of the two lateral faces, wherein first, second, and third circular grooves are formed concentric with each other on at least one of the two lateral faces of the roller and are not formed on the setback portion, such that a first distance between the first circular groove and the second circular groove directly adjacent to the first circular groove is larger than a second distance between the second circular groove and the third circular groove directly adjacent to the second circular groove, such that no other circular grooves are disposed between the first circular groove and the second circular groove, and such that no other circular grooves are disposed between the second circular groove and the third circular groove.

11. The mechanical system according to claim 10, wherein the circular grooves are formed concentric with each other and with the central axis on at least one of the two lateral faces of the roller.

12. The mechanical system according to claim 10, wherein the circular grooves are formed on the two lateral faces of the roller.

13. The mechanical system according to claim 10, forming the cam follower, wherein the support element is a tappet movable in translation along a second axis perpendicular to the central axis.

14. The mechanical system according to claim 10, wherein the mechanical system is integrated into an injection pump for a motor vehicle.

15. The mechanical system according to claim 10, wherein the mechanical system is integrated into a valve actuator for a motor vehicle.

\* \* \* \* \*